US012668098B2

(12) United States Patent
Rich et al.

(10) Patent No.: US 12,668,098 B2
(45) Date of Patent: Jun. 30, 2026

(54) HVAC INLET CONTROL BASED ON THERMAL EVENT

(71) Applicant: GM GLOBAL TECHNOLOGY OPERATIONS LLC, Detroit, MI (US)

(72) Inventors: Dave Gerard Rich, Sterling Heights, MI (US); Joshua Aaron Vallender, Pinon Hills, CA (US); Jermaine L. StanFord, Oak Park, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 18/526,345

(22) Filed: Dec. 1, 2023

(65) Prior Publication Data

US 2025/0178408 A1 Jun. 5, 2025

(51) Int. Cl.
 *B60H 1/00* (2006.01)
 *B60L 58/00* (2019.01)
 *B60L 58/24* (2019.01)

(52) U.S. Cl.
 CPC .......... *B60H 1/00849* (2013.01); *B60L 58/00* (2019.02)

(58) Field of Classification Search
 CPC ..... B60H 1/00849; B60L 58/00; B60L 58/24; B60L 58/26
 USPC ........................................................ 701/36
 See application file for complete search history.

(56) References Cited

U.S. PATENT DOCUMENTS

| | | | | |
|---|---|---|---|---|
| 6,871,126 B2 * | 3/2005 | Gorman | ............. | B60H 1/00828 |
| | | | | 165/202 |
| 7,441,414 B2 * | 10/2008 | Ziehr | ................. | B60H 1/00828 |
| | | | | 165/202 |
| 8,465,350 B2 * | 6/2013 | Kilian | ................. | H01M 10/633 |
| | | | | 62/133 |
| 8,679,658 B2 * | 3/2014 | Karlsson | ................. | B60L 58/26 |
| | | | | 429/50 |
| 8,932,743 B2 * | 1/2015 | Simonini | ............. | H01M 10/66 |
| | | | | 429/61 |
| 10,214,078 B2 * | 2/2019 | Cosgrove | ............. | B60H 1/3208 |
| 10,286,751 B2 * | 5/2019 | Jackson | ............... | B60H 1/0075 |
| 10,576,806 B1 * | 3/2020 | Madireddi | ......... | B60H 1/00742 |
| 10,603,982 B2 * | 3/2020 | Ragazzi | ............. | B60H 1/00807 |
| 10,658,714 B2 * | 5/2020 | Grace | ................. | H01M 10/488 |
| 11,787,260 B2 * | 10/2023 | Faust | ................. | B60H 1/00871 |
| | | | | 454/75 |
| 2003/0080714 A1 | 5/2003 | Inoue et al. | | |
| 2006/0075766 A1 * | 4/2006 | Ziehr | ................. | B60H 1/00828 |
| | | | | 62/186 |
| 2009/0001183 A1 * | 1/2009 | Kilian | ............... | B60H 1/00492 |
| | | | | 237/5 |
| 2009/0286459 A1 * | 11/2009 | Major | ....................... | B60L 1/02 |
| | | | | 454/75 |

(Continued)

*Primary Examiner* — Manglesh M Patel
(74) *Attorney, Agent, or Firm* — Ingrassia Fisher & Lorenz, LLP | IF&L

(57) ABSTRACT

In an exemplary embodiment, a system is provided that includes one or more sensors and a processor. The one or more sensors are configured to at least facilitate obtaining sensor data as to a vehicle. The processor is coupled to the one or more sensors, and is configured to at least facilitate obtaining sensor data from the one or more sensors; determining whether a thermal event occurs for the vehicle, based on the sensor data; and controlling an inlet for a climate control system for the vehicle based at least in part on whether the thermal event has occurred.

16 Claims, 3 Drawing Sheets

(56) References Cited

U.S. PATENT DOCUMENTS

| | | | |
|---|---|---|---|
| 2010/0012295 A1* | 1/2010 | Nemesh | H01M 10/6568 |
| | | | 165/104.19 |
| 2012/0003910 A1* | 1/2012 | Richter | B60H 1/00385 |
| | | | 454/141 |
| 2012/0082871 A1* | 4/2012 | Simonini | B60L 58/24 |
| | | | 429/50 |
| 2013/0122796 A1* | 5/2013 | Lim | B60H 1/00278 |
| | | | 454/75 |
| 2014/0262132 A1* | 9/2014 | Connell | B60H 1/00321 |
| | | | 165/96 |
| 2015/0137962 A1* | 5/2015 | Binnicker | B60N 2/26 |
| | | | 340/457 |
| 2018/0111446 A1* | 4/2018 | Cosgrove | B60H 1/3208 |
| 2019/0118613 A1* | 4/2019 | Ragazzi | B60H 1/00807 |
| 2019/0130274 A1* | 5/2019 | Guo | G06N 7/00 |
| 2020/0361281 A1* | 11/2020 | Williams | B60H 1/00385 |
| 2020/0369113 A1* | 11/2020 | Shrivastava | B60H 1/00257 |
| 2021/0335061 A1* | 10/2021 | Claessens | G07C 5/0816 |
| 2024/0051370 A1* | 2/2024 | Ljungblad | B60H 1/00849 |
| 2024/0109397 A1* | 4/2024 | Song | B60H 1/2225 |
| 2025/0256548 A1* | 8/2025 | Stout | B60H 1/0075 |

* cited by examiner

HVAC INLET CONTROL BASED ON THERMAL EVENT

INTRODUCTION

The technical field generally relates to vehicles and, more specifically, to methods and systems for controlling climate control systems for vehicles.

Many vehicles today have climate control systems, such as one or more heating, ventilation, and air conditioning (HVAC) systems. However, existing techniques may not always provide optimal control of the HVAC under certain conditions.

Accordingly, it is desirable to provide improved methods and systems for controlling climate control systems, such as HVAC systems, of a vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is disclosed that includes obtaining sensor data from one or more sensors of a vehicle; determining, via a processor of the vehicle, whether a thermal event occurs for the vehicle, based on the sensor data; and controlling an inlet for a climate control system for the vehicle based at least in part on whether the thermal event has occurred.

Also in an exemplary embodiment, the thermal event pertains to a component of the vehicle other than the climate control system.

Also in an exemplary embodiment, the thermal event pertains to a rechargeable energy storage system of the vehicle.

Also in an exemplary embodiment, the step of determining whether the thermal event has occurred includes determining, via the processor, that the thermal event has occurred when a temperature reading of one or more of the sensors with respect to the component exceeds a predetermined value.

Also in an exemplary embodiment, step of determining whether the thermal event has occurred includes determining, via the processor, that the thermal event has occurred when a temperature reading of one or more of the sensors with respect to the component exceeds a predetermined value.

Also in an exemplary embodiment, the step of determining whether the thermal event has occurred includes determining, via the processor, that the thermal event has occurred when a plurality of temperature readings of one or more of the sensors with respect to the component has a rate of change that exceeds a predetermined value.

Also in an exemplary embodiment, the step of controlling the inlet includes: automatically closing the inlet, in accordance with instructions provided by the processor, when it is determined that the thermal event has occurred; and automatically allowing the inlet to remain open, in accordance with instructions provided by the processor, when it is determined that the thermal event has not occurred.

Also in an exemplary embodiment, the method further includes automatically turning off airflow into a cabin of the vehicle, in accordance instructions provided by the processor, when it is determined that the thermal event has occurred.

Also in an exemplary embodiment, the method further includes automatically activating a recirculation mode for airflow of a cabin of the vehicle, in accordance instructions provided by the processor, when it is determined that the thermal event has occurred.

In another exemplary embodiment, a system is provided that includes one or more sensors and a processor. The one or more sensors are configured to at least facilitate obtaining sensor data as to a vehicle. The processor is coupled to the one or more sensors, and is configured to at least facilitate obtaining sensor data from the one or more sensors; determining whether a thermal event occurs for the vehicle, based on the sensor data; and controlling an inlet for a climate control system for the vehicle based at least in part on whether the thermal event has occurred.

Also in an exemplary embodiment, the thermal event pertains to a component of the vehicle other than the climate control system.

Also in an exemplary embodiment, the thermal event pertains to a rechargeable energy storage system of the vehicle.

Also in an exemplary embodiment, the processor is further configured to at least facilitate determining that the thermal event has occurred when a temperature reading of one or more of the sensors with respect to the component exceeds a predetermined value.

Also in an exemplary embodiment, the processor is further configured to at least facilitate determining that the thermal event has occurred when a temperature reading of one or more of the sensors with respect to the component exceeds a predetermined value.

Also in an exemplary embodiment, the processor is further configured to at least facilitate determining that the thermal event has occurred when a plurality of temperature readings of one or more of the sensors with respect to the component has a rate of change that exceeds a predetermined value.

Also in an exemplary embodiment, the processor is further configured to at least facilitate automatically closing the inlet, in accordance with instructions provided by the processor, when it is determined that the thermal event has occurred; and automatically allowing the inlet to remain open, in accordance with instructions provided by the processor, when it is determined that the thermal event has not occurred.

Also in an exemplary embodiment, the processor is further configured to at least facilitate automatically turning off airflow into a cabin of the vehicle, in accordance instructions provided by the processor, when it is determined that the thermal event has occurred.

Also in an exemplary embodiment, the processor is further configured to at least facilitate automatically activating a recirculation mode for airflow of a cabin of the vehicle, in accordance instructions provided by the processor, when it is determined that the thermal event has occurred.

In another exemplary embodiment, a vehicle is provided that includes a climate control system, one or more sensors, and a processor. The climate control system includes an inlet. The one or more sensors are configured to at least facilitate obtaining sensor data as to the vehicle. The processor is coupled to the one or more sensors, and is configured to at least facilitate obtaining sensor data from the one or more sensors; determining whether a thermal event occurs, the thermal event pertaining one or more vehicle components other than the climate control system, based on the sensor data; and controlling the inlet for the climate control system for the vehicle based at least in part on whether the thermal event has occurred.

Also in an exemplary embodiment, the processor is further configured to at least facilitate automatically closing the inlet, in accordance with instructions provided by the processor, when it is determined that the thermal event has occurred; and automatically allowing the inlet to remain open, in accordance with instructions provided by the processor, when it is determined that the thermal event has not occurred.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
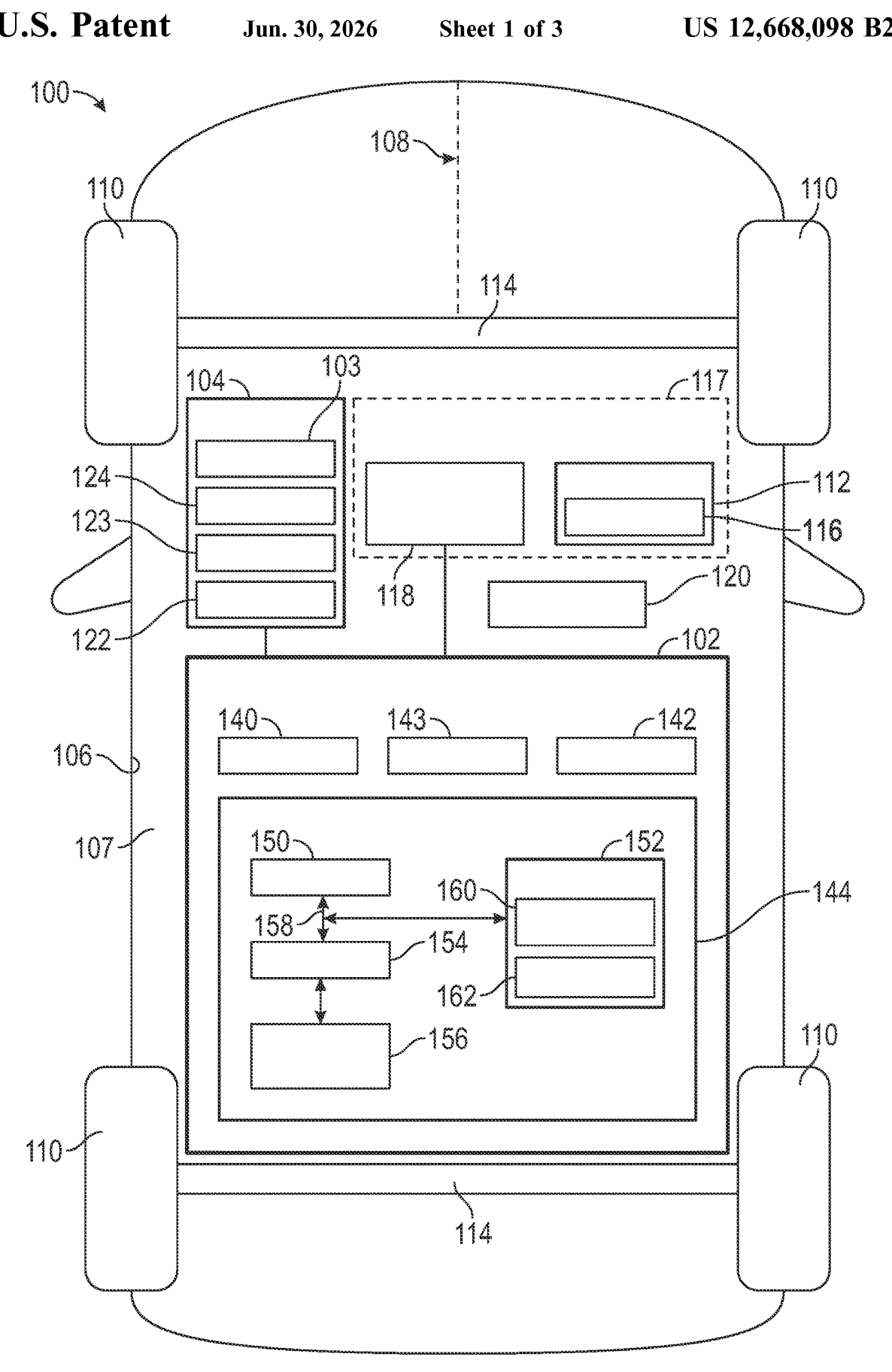
FIG. 1 is a functional block diagram of a vehicle that includes a climate control system having an inlet, and that further includes a control system for controlling the inlet of the climate control system based on thermal events of one or more other components of the vehicle.

FIG. 1 illustrates a vehicle 100, according to an exemplary embodiment. As described in greater detail further below, the vehicle 100 includes a climate control system 104 having an inlet 103, with the vehicle 100 also having a control system 102 for controlling an inlet 103 based on a thermal event of one or more other components of the vehicle 100, as described in greater detail further below in connection with the vehicle 100 of FIG. 1 as well as the process 200 of FIG. 2 and the implementations of FIGS. 3A and 3A.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 106 that is arranged on a chassis 108. The body 106 substantially encloses other components of the vehicle 100. The body 106 and the chassis 108 may jointly form a frame. The vehicle 100 also includes a plurality of wheels 110. The wheels 110 are each rotationally coupled to the chassis 108 near a respective corner of the body 106 to facilitate movement of the vehicle 100. In one embodiment, the vehicle 100 includes four wheels 110, although this may vary in other embodiments (for example for trucks and certain other vehicles).

A drive system 112 is mounted on the chassis 108, and drives the wheels 110, for example via axles 114. In various embodiments, the drive system 112 comprises a propulsion system that includes a motor 116 (e.g., an internal combustion engine and/or an electric motor/generator, coupled with a transmission thereof). In certain embodiments, the drive system 112 includes or is coupled to an accelerator pedal that receives inputs from a driver of the vehicle 100. In certain embodiments, the drive system 112 is automatically controlled via the control system 102 (e.g., for an autonomous vehicle).

Also as depicted in FIG. 1, in various embodiments the vehicle 100 also includes one or more rechargeable energy storage systems (RESS) 118. In various embodiments, the RESS 118 includes a lithium-ion battery that is utilized for powering the drive system 112 and/or one or more other components of the vehicle 100.

As depicted in FIG. 1, in various embodiments, the motor (e.g., engine) 116 and the RESS 118 are both housed within an engine compartment 117 of the vehicle 100. In various embodiments, the engine compartment 117 seals off the drive system 112 (including an engine 116 and/or other motor 116 thereof) and the RESS 118 from a cabin 107 of the vehicle in which passengers are positioned while inside the vehicle 100.

Also in various embodiments, the vehicle 100 may also include any number of other systems 120. These may include, by way of example, lighting control systems, climate control systems, and infotainment systems, among various other possible systems. In certain embodiments, these other systems 120 may also be controlled in whole or in part by the control system 102.

In various embodiments, the climate control system 104 provides climate control, including heating or heating, for the vehicle 100 and/or for components thereof. In certain embodiments, the climate control system 104 comprises a heating, ventilation, and air conditioning (HVAC) system for the vehicle 100.

As depicted in FIG. 1, in various embodiments the climate control system 104 includes the above-referenced inlet 103, in addition to one or more actuators 122, contactors 123, and shutters 124. In various embodiments, the inlet 103 allows and controls air flow between the cabin 107, the engine compartment 117, and outside the vehicle 100.

Also in various embodiments, the shutters 124 (e.g., shutter doors) are movable between an open position and in a closed position. Specifically, in various embodiments, when the shutters 124 are in the open position, air is allowed to freely flow through the inlet 103. Conversely, in various embodiments, when the shutters 124 are in the closed position, air is restricted or prevents from flowing through the inlet 103. In various embodiments, the shutters 124 are moved between the open and closed positions via the contactors 123 and/or actuators 122 in accordance with instructions provided by the control system 102.

With continued reference to FIG. 1, in various embodiments the control system 102 controls operation of the climate control system 104. Specifically, in various embodiments, the control system 102 controls operation of the inlet 103 (via the actuators 122, contactors 123, and shutters 124) based on thermal events elsewhere in the vehicle 100, such as the RESS 118, the motor 116, and/or one or more other systems 120 of the vehicle 100. In various embodiments, the control system 102 provides these functions in accordance with the process 200 of FIG. 2 and the implementations of FIGS. 3A and 3B, as described in greater detail further below. In addition, in various embodiments, the control system 102 may also control, in whole or in part, various other components of the vehicle 100, such as the drive system 112, the RESS 118, and/or other systems 120 of the vehicle 100. In certain embodiments, the control system may be part of a body control module (BCM), engine control module (ECM), or the like, of the vehicle 100. However, this may vary in other embodiments.

As depicted in FIG. 1, in various embodiments, the control system 102 includes sensors and a controller 144. In addition, also as depicted in FIG. 1, in various embodiments the control system 102 may also include a transceiver 142 and a display 143, among other possible components.

In various embodiments, the sensors 140 collect data pertaining to the vehicle 100 and its components, including for detecting thermal events for the vehicle 100. In various embodiments, the sensors 140 include a plurality of heat detection sensors. Also in various embodiments, the sensors 140 may be deployed in proximity to the RESS 118, the drive system 112, and/or other systems 120 for detection of thermal events pertaining to any of these devices and systems.

In certain embodiments, the transceiver 142 is utilized in obtaining data as to a thermal event for the vehicle 100, for example from the sensors 140 and/or from the RESS 118, drive system 112, other systems 120, and/or from one or more other sources. Also in certain embodiments, the transceiver 142 may be utilized in providing instructions from the control system 102 to the climate control system 104. In certain other embodiments (e.g., in which information is instead transmitted along a vehicle communications bus) a transceiver 142 may not be needed.

In certain embodiments, the display 143 is configured to provide a display that includes information as to the control of the climate control unit 104 (e.g., including when the inlet 103 thereof is commanded shut due to a vehicle thermal event), in accordance with instructions provided by the controller 144. In various embodiments, the display 143 may include a visual component (e.g., via a display screen), an audio component (e.g., via one or more speakers), or both.

In various embodiments, the controller 144 is coupled to the sensors 140 and receives sensor data therefrom. In various embodiments, the controller 144 is further coupled to the climate control system 104, and in certain embodiments one or more of (and, in certain embodiments, to each of) the transceiver 142, display 143, RESS 118, drive system 112, and/or other systems 120 of the vehicle 100. In various embodiments, the controller 144 controls the climate control system 104 (including opening and closing the inlet 103) based on thermal events of other vehicle components (among various other functions in various embodiments), including as described further below in connection with the process 200 of FIG. 2 and the implementations of FIGS. 3A and 3B.

In various embodiments, the controller 144 comprises a computer system (also referred to herein as computer system 144). In various embodiments, the controller 144 (and, in certain embodiments, the control system 102 itself) is disposed within the body 106 of the vehicle 100. In one embodiment, the control system 102 is mounted on the chassis 108. In certain embodiments, the controller 144 and/or control system 102 and/or one or more components thereof may be disposed outside the body 106, for example on a remote server, in the cloud, or the like.

It will be appreciated that the controller 144 may otherwise differ from the embodiment depicted in FIG. 1. For example, the controller 144 may be coupled to or may otherwise utilize one or more remote computer systems and/or other control systems, for example as part of one or more of the above-identified vehicle 100 devices and systems.

In the depicted embodiment, the computer system of the controller 144 includes a processor 150, a memory 152, an interface 154, a storage device 156, and a bus 158. The processor 150 performs the computation and control functions of the controller 144, and may comprise any type of processor or multiple processors, single integrated circuits such as a microprocessor, or any suitable number of integrated circuit devices and/or circuit boards working in cooperation to accomplish the functions of a processing unit. During operation, the processor 150 executes one or more programs 160 contained within the memory 152 and, as such, controls the general operation of the controller 144 and the computer system of the controller 144, generally in executing the processes described herein, such as the process 200 of FIG. 2 and the implementations of FIGS. 3A and 3B and described further below in connection therewith.

The memory 152 can be any type of suitable memory, including various types of non-transitory computer readable storage medium. In certain examples, the memory 152 is located on and/or co-located on the same computer chip as the processor 150. In the depicted embodiment, the memory 152 stores the above-referenced program 160 along with stored values 162 (e.g., look-up tables, thresholds, and/or other values with respect to thermal events of the vehicle 100).

The interface 154 allows communication to the computer system of the controller 144, for example from a system driver and/or another computer system, and can be implemented using any suitable method and apparatus. In one embodiment, the interface 154 obtains the various data from the sensors 140, among other possible data sources. The interface 154 can include one or more network interfaces to communicate with other systems or components. The interface 154 may also include one or more network interfaces to communicate with technicians, and/or one or more storage interfaces to connect to storage apparatuses, such as the storage device 156.

The storage device 156 can be any suitable type of storage apparatus, including various different types of direct access storage and/or other memory devices. In one exemplary embodiment, the storage device 156 comprises a program product from which memory 152 can receive a program 160 that executes one or more embodiments of one or more processes of the present disclosure, such as the steps of the process 200 of FIG. 2 and the implementations of FIGS. 3A and 3B and described further below in connection therewith. In another exemplary embodiment, the program product may be directly stored in and/or otherwise accessed by the memory 152 and/or a disk (e.g., disk 164), such as that referenced below.

The bus 158 serves to transmit programs, data, status and other information or signals between the various components of the computer system of the controller 144. The bus 158 can be any suitable physical or logical means of connecting computer systems and components. This includes, but is not limited to, direct hard-wired connections, fiber optics, infrared and wireless bus technologies. During operation, the program 160 is stored in the memory 152 and executed by the processor 150.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 150) to perform and execute the program.

Figure 2:
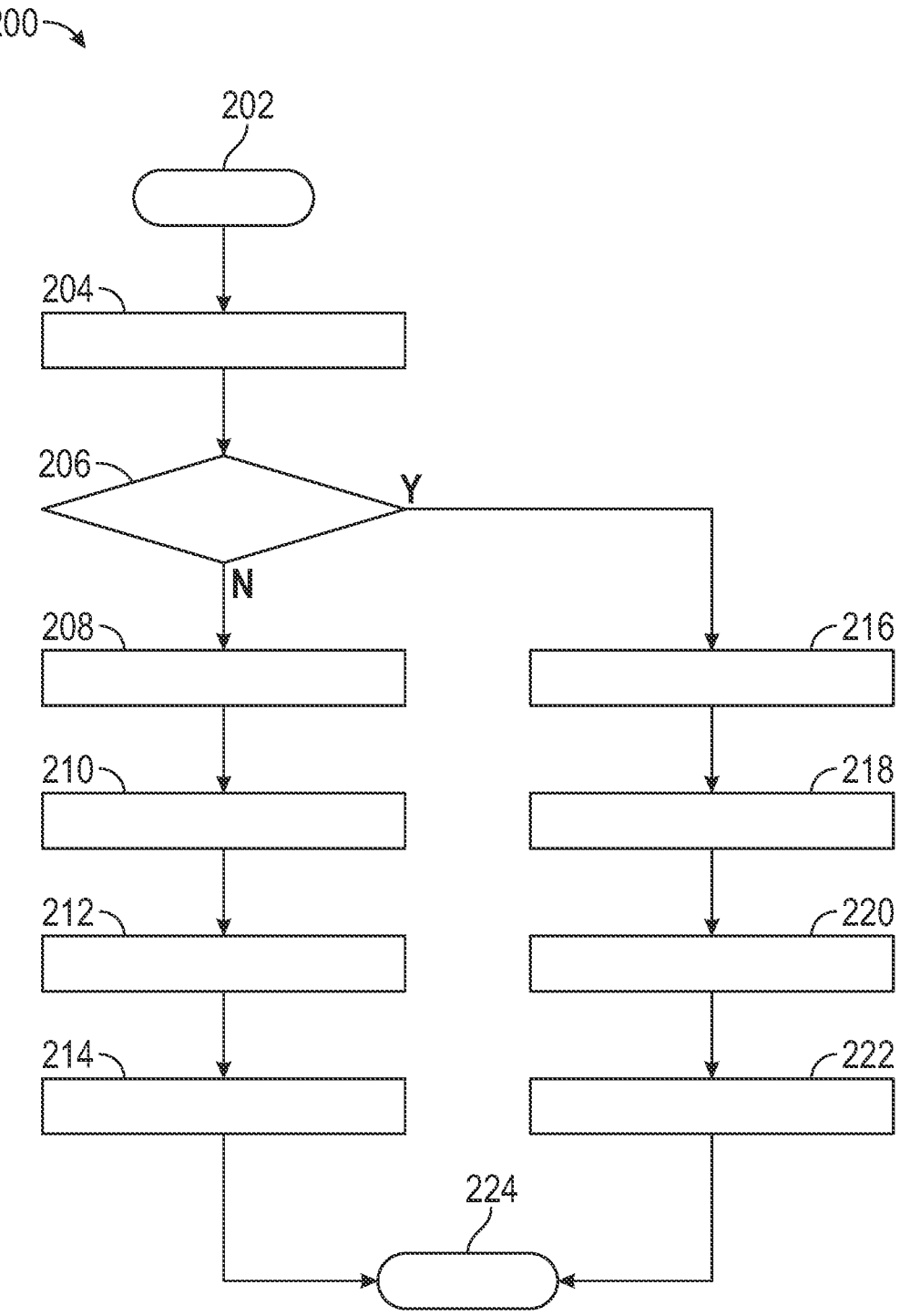
FIG. 2 is a flowchart of process for controlling the inlet of a climate control system based on thermal events of one or more other devices, and that can be implemented in connection with the vehicle of FIG. 1, including the climate control system and the control system of FIG. 1, and components thereof, in accordance with exemplary embodiments.

FIG. 2 is a flowchart of process 200 for controlling the inlet of a climate control system based on thermal events of one or more other devices, in accordance with exemplary embodiments. The process 200 can be implemented in connection with the vehicle 100 of FIG. 1, including the climate control system 104 and the control system 102 of FIG. 1, and components thereof, in accordance with exemplary embodiments.

The process 200 will also be described below with reference to FIGS. 3A and 3B, which depict illustrative implementations of the process 200 of FIG. 2, utilizing components of the vehicle 100 of FIG. 1, in accordance with exemplary embodiments.

As depicted in FIG. 2, the process 200 begins at step 202. In one embodiment, the process 200 begins when the vehicle 100 is or has been operated, for example during or after a current vehicle drive. In one embodiment, the steps of the process 200 are performed continuously once the process 200 begins.

Sensor data is obtained at step 204. In various embodiments, sensor data pertaining to the vehicle is obtained via each of the sensors 140 of FIG. 1. In certain embodiments, the sensor data of step 204 includes temperature readings from various temperature sensors 140 of the vehicle 100. In certain embodiments, the temperature readings pertain to the RESS 118. In various other embodiments, the temperature readings may also pertain to the drive system 112 (e.g., an engine or other motor 116) and/or one or more other systems 120 of the vehicle 100.

A determination is made as to whether a thermal event has occurred (step 206). In various embodiments, this determination is made by the processor 150 of FIG. 1 based on the sensor data of step 204. In various embodiments, the thermal event pertains to one or more components of the vehicle 100 other than the climate control system 104 of FIG. 1. In various embodiments, the thermal event pertains to the RESS 118 of FIG. 1 (and/or in certain embodiments to the drive system 112 and/or other systems 120 of the vehicle 100). In certain embodiments, a thermal event is determined to have occurred when any one or more of the following have occurred: (a) a temperature reading from any of the sensors 140 exceeds a first predetermined threshold (e.g., larger than expected for the particular component); (b) temperature readings from any of the sensors 140 increase with a rate of change that exceeds a second predetermined threshold (e.g., larger than expected for the particular component); or (c) temperature readings from different respective sensors 140 (e.g., pertaining to the same vehicle component) differ from one another by a difference (or delta) that exceeds a third predetermined threshold (e.g., larger than expected for different temperature sensors 140 for the particular component). In various embodiments, the threshold values are obtained from the memory 152 of FIG. 1 as stored values 162 therein. In addition, in certain embodiments, a thermal event may also be determined when one or more sensor values comprise one or more irrational values and/or values that are not within plausible limits of operation of the sensor (e.g., such as a particularly cold temperature value that is less than a predetermined threshold value that represents a minimum plausible value for the sensor), and/or one or more other indications are obtained as to possible damage to one or more sensors (e.g., as may occur when a thermal event has caused a short or open circuit on the sensor, and so on).

In various embodiment, if it is determined in step 206 that a thermal event has not occurred, then the process proceeds to step 208. In various embodiments, during step 208, the climate control system 104 is operated in accordance with standard, default, or normal temperature operation.

In various embodiments, during step 208, the inlet 103 is allowed to remain open in accordance with instructions provided by the processor 150 of FIG. 1. Specifically, in various embodiments, the processor 150 provides instructions for the contactors 123 to be closed (step 210) and the shutters 124 to be in the open position (step 212) (e.g., in certain embodiments, as accomplished via the actuators 122 of FIG. 1 in accordance with the instructions provided by the processor 150), to thereby open the inlet 103. In certain embodiments, the processor 150 also provides instructions for airflow to be turned on flow through the open inlet 103 (step 214). In certain embodiments, the process 200 then terminates (step 224).

Figure 3A:
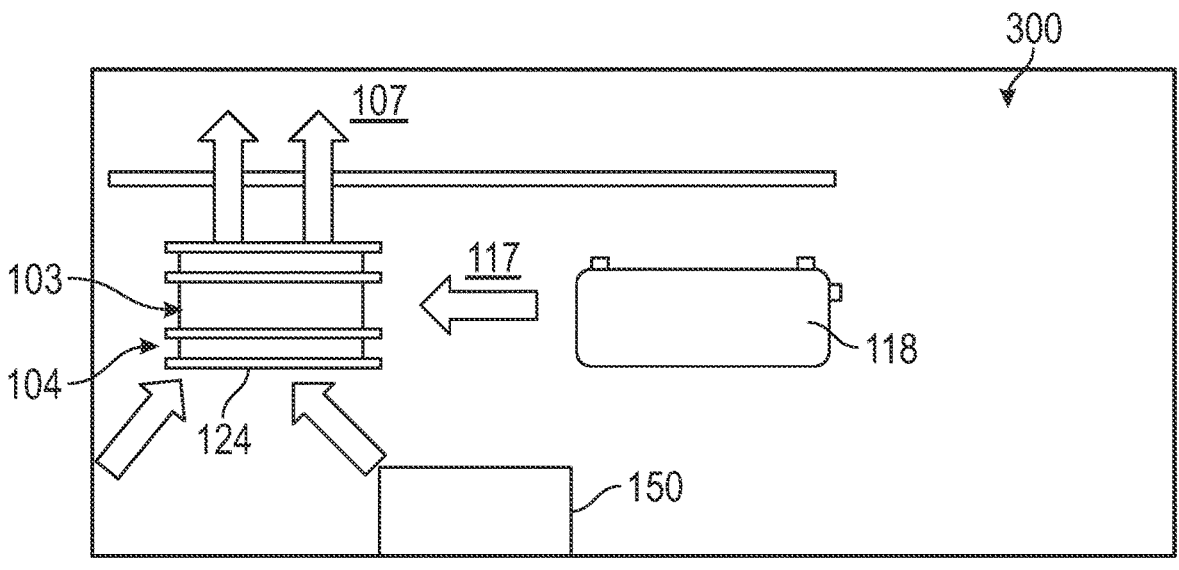
FIGS. 3A and 3B depict illustrative implementations of the process of FIG. 2, utilizing components of the vehicle of FIG. 1, in accordance with exemplary embodiments.

With reference to FIG. 3A, an exemplary implementation is provided of the operation of the climate control system 104 in accordance with the open inlet 103 in steps 208-214 when a thermal event is not detected, in accordance with exemplary embodiments. Specifically, as depicted in FIG. 3A in accordance with an exemplary embodiment, the shutters 124 are depicted in an open position, thereby allowing air to flow freely through the inlet 103. Accordingly, as depicted in FIG. 3A, air is allowed to flow freely between the engine compartment 117 and the cabin 107 of the vehicle 100.

With reference back to step 206 of FIG. 2, if it is instead determined that a thermal event has occurred, then the process proceeds instead to step 216. In various embodiments, during step 208, the climate control system 104 is operated in accordance with high temperature operation.

In various embodiments, during step 216, the inlet 103 is closed in accordance with instructions provided by the processor 150 of FIG. 1. Specifically, in various embodiments, the processor 150 provides instructions for the contactors 123 to be opened (step 218) and the shutters 124 to be moved to the closed position (step 220) (e.g., in certain embodiments, as accomplished via the actuators 122 of FIG. 1 in accordance with the instructions provided by the processor 150), to thereby close the inlet 103. In certain embodiments, the processor 150 also provides instructions for airflow to be turned off (so that air does not flow through the inlet 103), and/or for the air to flow via a recirculation mode (step 222) (for example, in which air is re-circulated within the cabin 107 instead of introducing new air into the cabin 107). In addition, in certain embodiments, the processor 150 also provides instructions for a visual and/or audio notification (e.g., notifying the occupants of the vehicle 100 as to the possibility of the thermal event and as to the reason why the inlet is being forced closed) to be provided via the display 143 of FIG. 1 (e.g., as part of step 216, and/or as part of one or more of steps 218, 220, and/or 222, in certain embodiments). In certain embodiments, the process 200 then terminates (step 224).

Figure 3B:
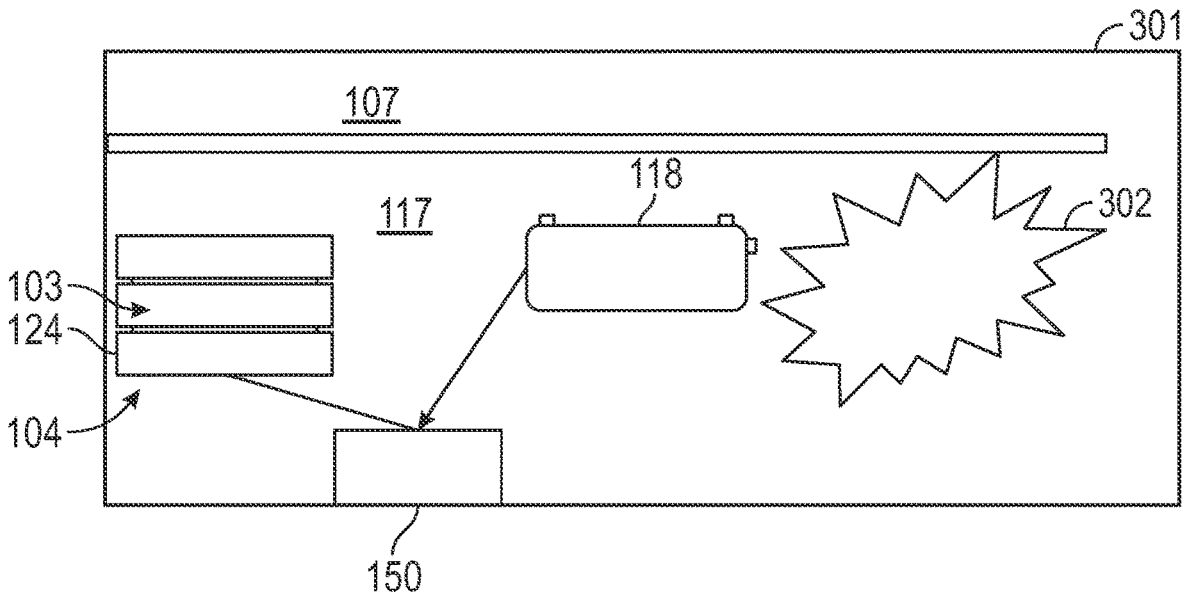

With reference to FIG. 3B, an exemplary implementation is provided of the operation of the climate control system 104 in accordance with the closed inlet 103 in steps 216-222 when a thermal event is detected, in accordance with exemplary embodiments. Specifically, as depicted in FIG. 3B in accordance with an exemplary embodiment, the shutters 124 are depicted in a closed position, thereby restricting (and in certain embodiments preventing) air from flowing through the inlet 103. Accordingly, as depicted in FIG. 3B, air is prevented from flowing between the engine compartment 117 and the cabin 107 of the vehicle 100. As a result, in various embodiments, if there are potentially harmful gases 302 in the engine compartment 117 as a result of the thermal event, such potentially harmful gases 302 will thus be prevented from entering the cabin 107 from the engine compartment 117.

It is noted that the implementation of steps 216-222 for the operation of the climate control system 104 during a thermal event may vary in certain embodiments. For example, in certain embodiments in which the thermal event is detected inside the vehicle 100 (e.g., if a thermal event is detected with respect to an RESS 118 and/or other component that is disposed within the cabin 107 instead of the engine compartment 117 of the vehicle 100), then the inlet 103 may instead be automatically moved to the open position of FIG. 3A in order to allow any gases to move from the cabin 107 to the engine compartment 117 and/or to be vented outside the vehicle 100, among other possible variations in certain embodiments.

In addition, while the drawings depict an automobile, it will be appreciated that the methods and systems disclosed herein may also be implemented in certain embodiments in any number of other different types of vehicles, other mobile platforms, and/or other devices.

Accordingly, methods, systems, and vehicles are provided for controlling a climate control system 104 of a vehicle 100 during a thermal event of another component of the vehicle 100. In various embodiments, an inlet 103 of the climate control system 104 is automatically closed when a thermal event is detected (e.g., in an engine compartment 117 of the vehicle), for example in order to prevent potentially harmful gases from entering a cabin 107 of the vehicle.

It will be appreciated that the systems, vehicles, and methods may vary from those depicted in the Figures and described herein. For example, the vehicle 100 of FIG. 1, the control system 102, and climate control system 104 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will also be appreciated that the implementations of FIGS. 3A and 3B may also vary in different embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data from one or more sensors of a vehicle pertaining to a component of the vehicle that is different from a climate control system of the vehicle;

determining, via a processor of the vehicle, whether a thermal event occurs for the vehicle, based on the sensor data, including based on:

(a) a temperature reading from any of the sensors of the component exceeds a first predetermined threshold temperature for the component;

(b) temperature readings from any of the sensors increase with a rate of change that exceeds a second predetermined threshold for the rate of change of the temperature for the component;

(c) temperature readings from different respective sensors pertaining to the component differ from one another by a difference that exceeds a third predetermined threshold for different temperature sensors for the component; and controlling an inlet for the climate control system for the vehicle based at least in part on whether the thermal event has occurred, and wherein the method further comprises:

determining, via the processor using the sensor data, whether the thermal event is occurring within an engine compartment or a passenger cabin of the vehicle;

automatically closing the inlet, in accordance with instructions provided by the processor, when it is determined that the thermal event has occurred within the engine compartment, thereby preventing harmful gases from entering the passenger compartment from the engine compartment; and automatically allowing the inlet to remain open, in accordance with instructions provided by the processor, when it is determined that the thermal event has occurred in the passenger cabin, thereby allowing the harmful gases to exit the passenger compartment into the engine compartment.

2. The method of claim 1, wherein the thermal event pertains to an engine of the vehicle.

3. The method of claim 2, wherein the step of determining whether the thermal event occurs is made by the processor, based on the sensor data, such that a thermal event is determined by processor to occur when any of the following have occurred:

(a) a temperature reading from any of the sensors of the engine exceeds a first predetermined threshold for the temperature for the engine;

(b) temperature readings from any of the sensors increase with a rate of change that exceeds a second predetermined threshold for the rate of change of the temperature for the engine; and (c) temperature readings from different respective sensors pertaining to the engine differ from one another by a difference that exceeds a third predetermined threshold for different temperature sensors for the engine.

4. The method of claim 2, wherein the step of determining whether the thermal event occurs is made by the processor, based on the sensor data, such that a thermal event is determined by processor to occur when each of the following have occurred:

(a) a temperature reading from any of the sensors of the engine of the vehicle exceeds a first predetermined threshold for the temperature for the engine;

(b) temperature readings from any of the sensors increase with a rate of change that exceeds a second predetermined threshold for the rate of change of the temperature for the engine; and (c) temperature readings from different respective sensors pertaining to the engine differ from one another by a difference that exceeds a third predetermined threshold for different temperature sensors for the engine.

5. The method of claim 1, wherein the thermal event pertains to a rechargeable energy storage system of the vehicle.

6. The method of claim 5, wherein the step of determining whether the thermal event occurs is made by the processor, based on the sensor data, such that the thermal event is determined by processor to occur when any of the following have occurred:

(a) a temperature reading from any of the sensors of a battery of the vehicle exceeds a first predetermined threshold for the temperature for the battery;

(b) temperature readings from any of the sensors increase with a rate of change that exceeds a second predetermined threshold for the rate of change of the temperature for the battery; and (c) temperature readings from different respective sensors pertaining to the battery differ from one another by a difference that exceeds a third predetermined threshold for different temperature sensors for the battery.

7. The method of claim 5, wherein the step of determining whether the thermal event occurs is made by the processor, based on the sensor data, such that the thermal event is determined by processor to occur when each of the following have occurred:

(a) a temperature reading from any of the sensors of a battery of the vehicle exceeds a first predetermined threshold for the temperature for the battery;

(b) temperature readings from any of the sensors increase with a rate of change that exceeds a second predetermined threshold for the rate of change of the temperature for the battery; and (c) temperature readings from different respective sensors pertaining to the battery differ from one another by a difference that exceeds a third predetermined threshold for different temperature sensors for the battery.

8. The method of claim 1, further comprising:

automatically turning off airflow into a cabin of the vehicle, in accordance with instructions provided by the processor, when it is determined that the thermal event has occurred.

9. The method of claim 1, further comprising:

automatically activating a recirculation mode for airflow of a cabin of the vehicle, in accordance with instructions provided by the processor, when it is determined that the thermal event has occurred.

10. The method of claim 1, further comprising:

providing an audio notification and a visual notification to passengers of the vehicle, in accordance with instructions provided by the processor, regarding the thermal event and as to the closing of the inlet, when it is determined that the thermal event has occurred.

11. A system comprising:

one or more sensors configured to at least facilitate obtaining sensor data pertaining to a component of the vehicle that is different from a climate control system of the vehicle; and a processor that is coupled to the one or more sensors and that is configured to at least facilitate:

obtaining sensor data from the one or more sensors;

determining whether a thermal event occurs for the vehicle, based on the sensor data, including based on:

(a) a temperature reading from any of the sensors of the component exceeds a first predetermined threshold for the temperature for the component;

(b) temperature readings from any of the sensors increase with a rate of change that exceeds a second predetermined threshold for the rate of change of the temperature for the component; and (c) temperature readings from different respective sensors pertaining to the component differ from one another by a difference that exceeds a third predetermined threshold for different temperature sensors for the component; and controlling an inlet for a climate control system for the vehicle based at least in part on whether the thermal event has occurred, and wherein the processor is further configured to at least facilitate:

determining, using the sensor data, whether the thermal event is occurring within an engine compartment or a passenger cabin of the vehicle;

automatically closing the inlet, in accordance with instructions provided by the processor, when it is determined that the thermal event has occurred within the engine compartment, thereby preventing harmful gases from entering the passenger compartment from the engine compartment; and automatically allowing the inlet to remain open, in accordance with instructions provided by the processor, when it is determined that the thermal event has occurred in the passenger cabin, thereby allowing the harmful gases to exit the passenger compartment into the engine compartment.

12. The system of claim 11, wherein the thermal event pertains to an engine of the vehicle.

13. The system of claim 12, wherein the thermal event pertains to a rechargeable energy storage system of the vehicle.

14. The system of claim 11, wherein the processor is further configured to at least facilitate automatically turning off airflow into a cabin of the vehicle, in accordance instructions provided by the processor, when it is determined that the thermal event has occurred.

15. The system of claim 11, wherein the processor is further configured to at least facilitate automatically activating a recirculation mode for airflow of a cabin of the vehicle, in accordance instructions provided by the processor, when it is determined that the thermal event has occurred.

16. A vehicle comprising:

a climate control system having an inlet;

one or more sensors configured to at least facilitate obtaining sensor data pertaining to a component of the vehicle that is different from a climate control system of the vehicle; and a processor that is coupled to the one or more sensors and that is configured to at least facilitate:

obtaining sensor data from the one or more sensors;

determining whether a thermal event occurs, the thermal event pertaining to one or more vehicle components other than the climate control system, based on the sensor data, including based on:

(a) a temperature reading from any of the sensors of the component exceeds a first predetermined threshold for the temperature for the component;

(b) temperature readings from any of the sensors increase with a rate of change that exceeds a second predetermined threshold for the rate of change of the temperature for the component; and (c) temperature readings from different respective sensors pertaining to the component differ from one another by a difference that exceeds a third predetermined threshold for different temperature sensors for the component; and controlling the inlet for the climate control system for the vehicle based at least in part on whether the thermal event has occurred, and wherein the processor is further configured to at least facilitate:

determining, using the sensor data, whether the thermal event is occurring within an engine compartment or a passenger cabin of the vehicle;

automatically closing the inlet, in accordance with instructions provided by the processor, when it is determined that the thermal event has occurred within the engine compartment, thereby preventing harmful gases from entering the passenger compartment from the engine compartment; and automatically allowing the inlet to remain open, in accordance with instructions provided by the processor, when it is determined that the thermal event has occurred in the passenger cabin, thereby allowing the harmful gases to exit the passenger compartment into the engine compartment.

\* \* \* \* \*